No. 637,349. Patented Nov. 21, 1899.
C. L. ROSENQVIST.
ALTERNATING CURRENT ELECTRIC MOTOR.
(Application filed Mar. 31, 1898.)

(No Model.) 4 Sheets—Sheet 1.

Witnesses
E. D. Bartlett
Frank J. Ames

Inventor
Conrad L. Rosenqvist
per Hubert Sefton Jones
Attorney

No. 637,349. Patented Nov. 21, 1899.
C. L. ROSENQVIST.
ALTERNATING CURRENT ELECTRIC MOTOR.
(Application filed Mar. 31, 1898.)
(No Model.) 4 Sheets—Sheet 2.

No. 637,349. Patented Nov. 21, 1899.
C. L. ROSENQVIST.
ALTERNATING CURRENT ELECTRIC MOTOR.
(Application filed Mar. 31, 1898.)
(No Model.) 4 Sheets—Sheet 3.
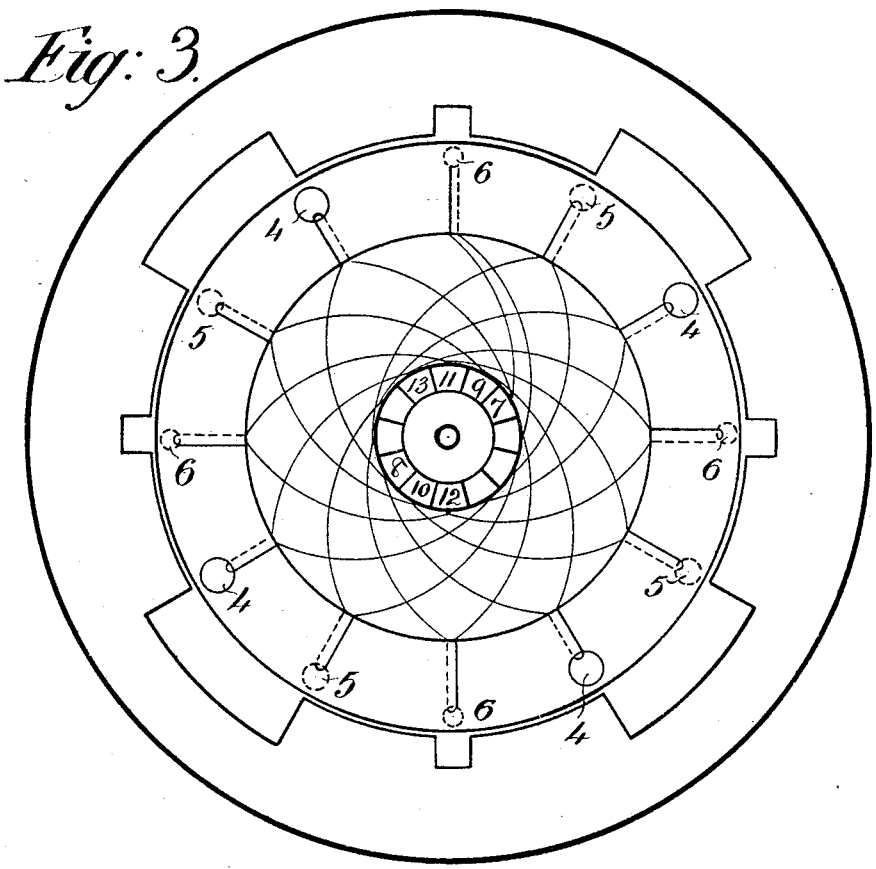
Fig: 3.
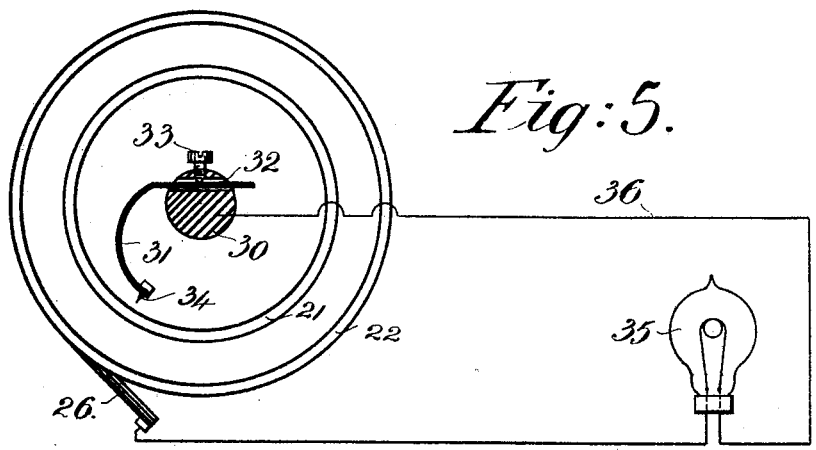
Fig: 5.
Witnesses.
Edwin Drew Bartlett
Frank J. Ames
Inventor
Conrad L. Rosenqvist
per Herbert Sefton-Jones
Attorney

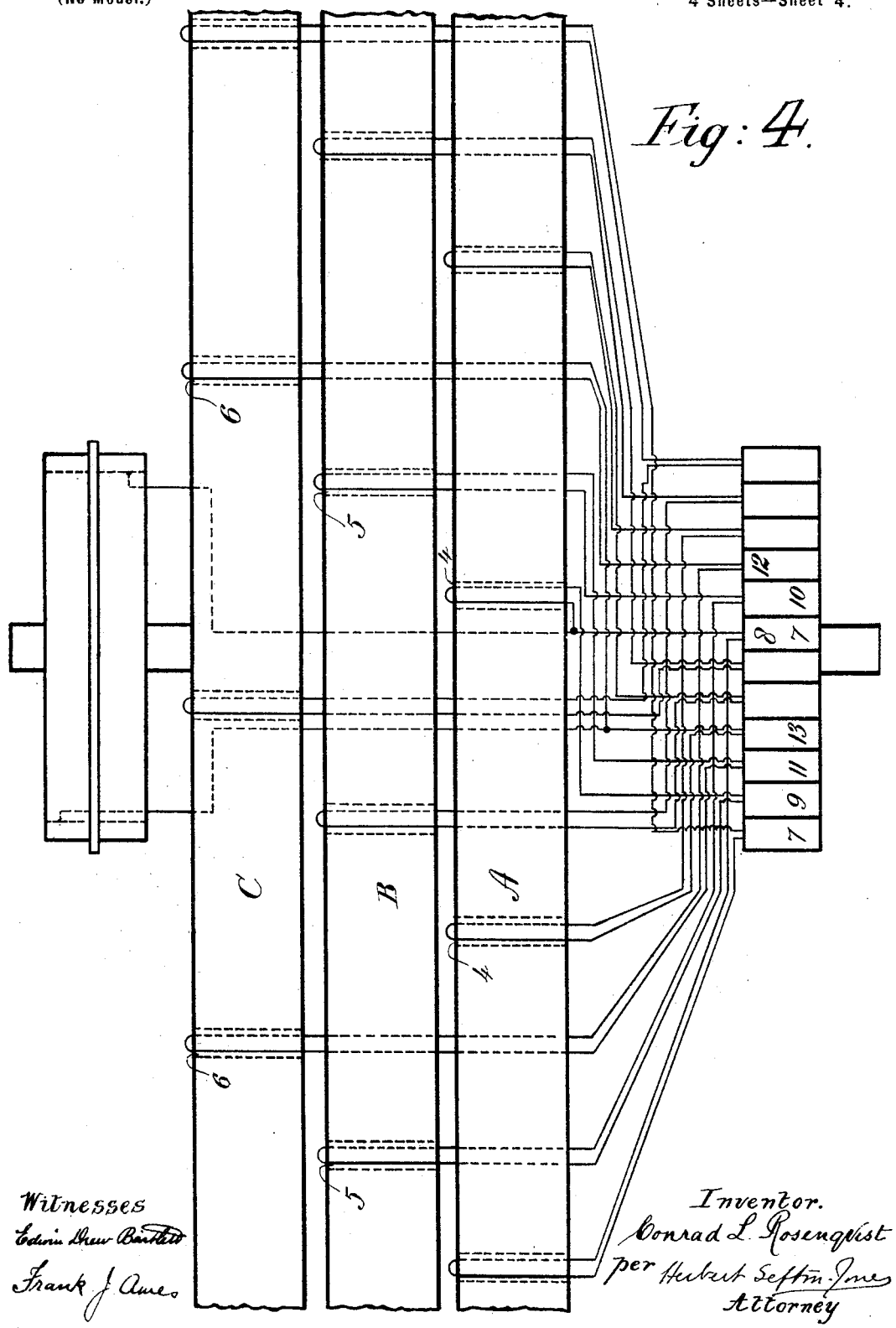

UNITED STATES PATENT OFFICE.

CONRAD LUDVIG ROSENQVIST, OF BIRMINGHAM, ENGLAND, ASSIGNOR TO VERITYS LIMITED, OF LONDON, ENGLAND.

ALTERNATING-CURRENT ELECTRIC MOTOR.

SPECIFICATION forming part of Letters Patent No. 637,349, dated November 21, 1899.

Application filed March 31, 1898. Serial No. 676,020. (No model.)

*To all whom it may concern:*

Be it known that I, CONRAD LUDVIG ROSENQVIST, engineer, a subject of the King of Sweden and Norway, residing at Birmingham, in the county of Warwick, England, have invented new and useful Improvements in or Relating to Dynamo-Electric Machinery, of which the following is a specification.

My invention relates to dynamo-electric machinery, and in particular to machines which are adapted to be operated either as single-phase alternating-current motors or as direct-current motors. Some of my improvements are, furthermore, applicable to motors and generators of the ordinary type.

The chief object of my invention is to provide a single-phase alternating-current motor which shall be capable of operating efficiently on circuits of any desired periodicity, which shall be effective in starting, and in which the current consumption will be regulated in proportion to the work done without causing any fluctuation in the lights operated from the same circuit.

The chief feature of my invention consists in an improved construction of dynamo-machine armature, and also in a new method of winding the field-magnets of those alternating-current motors in which two sets of windings are provided on the field-magnet, whereby when a current is flowing in one set of windings the secondary currents developed in the other set of windings are neutralized.

My invention also comprises an improved indicator which can be adjusted so that a lamp shall be lighted or an alarm given when the machine-spindle attains a predetermined speed of rotation.

My invention is illustrated in the accompanying drawings, in which—

Figure 1:
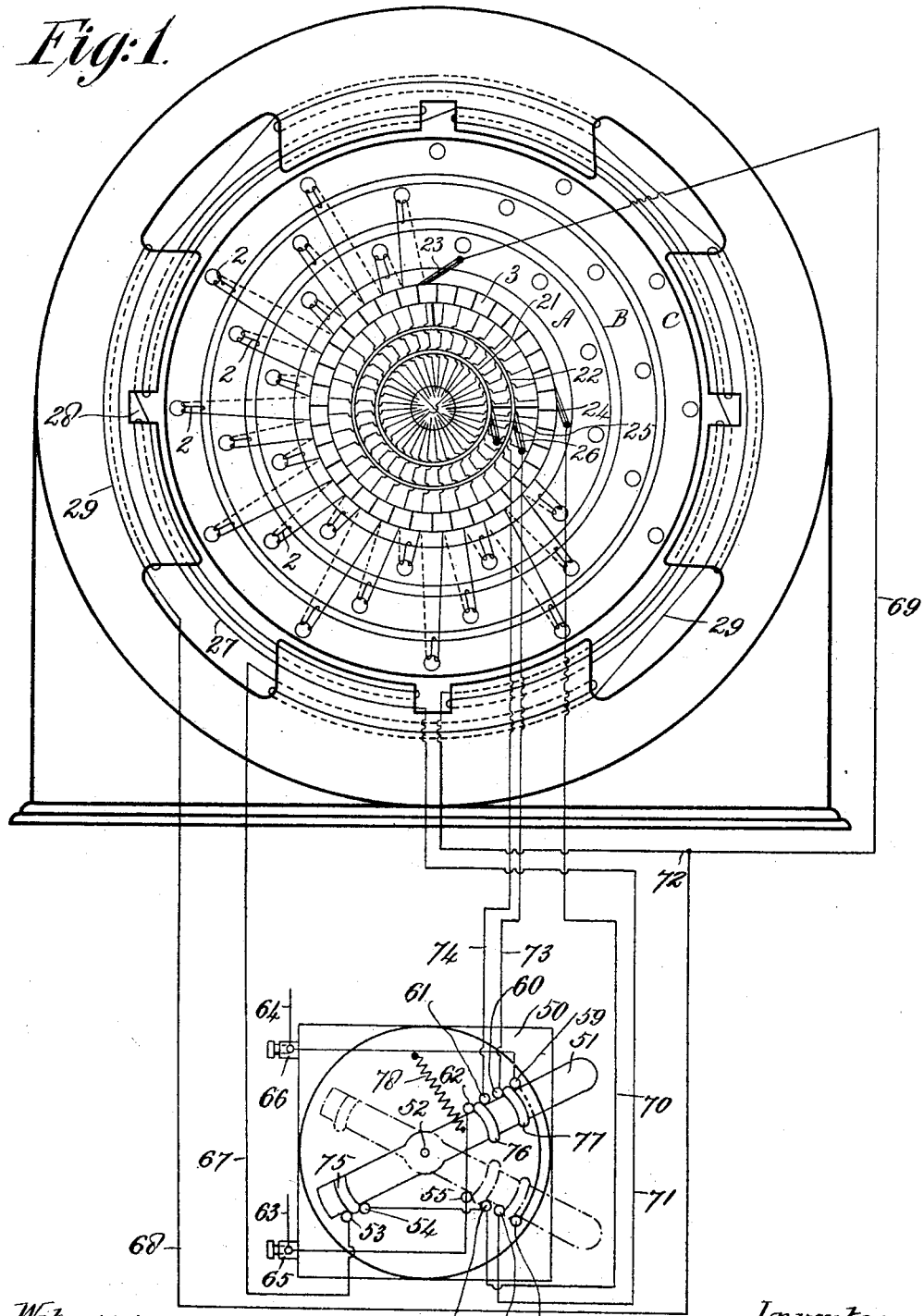
Figure 2:
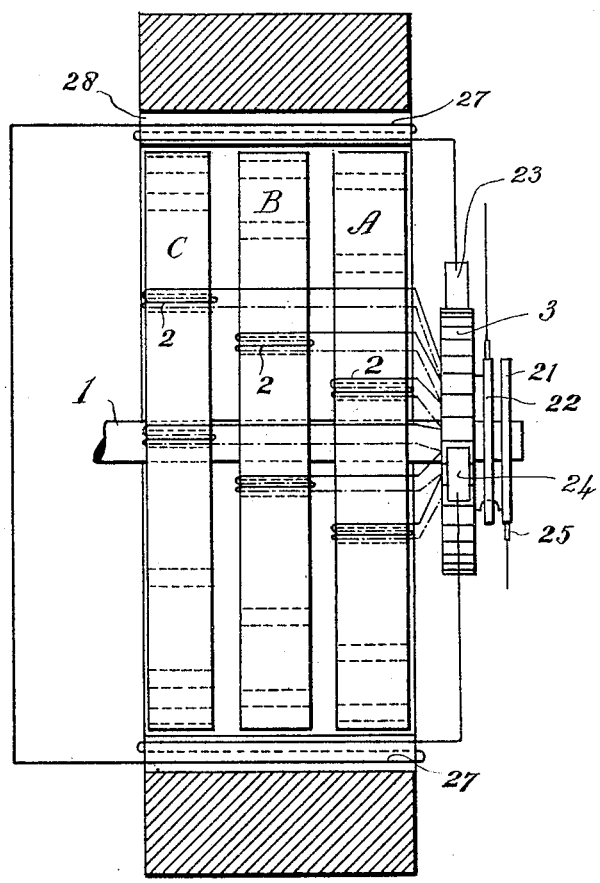

Figure 1 is an elevation, somewhat diagrammatical, of a four-pole machine having an armature constructed and wound according to my invention. Fig. 2 is a side elevation of the same. Fig. 3 is a diagram illustrating another method of connecting the armature-coils in a ring-armature. Fig. 4 is a diagram showing the development of an armature such as illustrated in Fig. 3. Fig. 5 is an elevation illustrating my improved device for lighting a lamp when a desired speed of rotation of a shaft has been obtained and will be hereinafter more fully explained.

Referring now more particularly to Figs. 1 and 2, my improved armatures are constructed with two or more separate cores, three being shown in the drawings, (marked A B C,) secured side by side on the same spindle 1. In Fig. 1 the cores are shown one outside the other in order that the position of the armature-coils may be somewhat more clearly indicated. Each core is wound with coils 2, and said coils are connected in succession to a single commutator 3. The cores A B C are staggered—that is to say, are secured to the shaft 1 in such a manner that the coils 2 thereon are displaced relatively with regard to each other, as clearly shown in Fig. 1.

In Figs. 1 and 2 the coils are connected in series and in succession, so that any one of the coils has its ends joined to coils which are not upon the same core as itself. For example, the ends of a coil on a core A are joined to coils on cores B and C, one on each side. The commutator-bars in a multipolar machine are cross-connected in the usual manner, as shown in Fig. 1, so that the two halves of the armature will be joined in parallel. The coils may, however, if desired, be so wound as to obviate the necessity for cross-connecting the commutator-bars, as shown for example, in Figs. 3 and 4.

In Fig. 3 the holes through which the coils are wound are shown as being of different sizes to indicate on which core of the armature the coil is situated, the large slots (marked 4) being in the core A, for example, the next size (marked 5) being in core B, and the smallest (6) in the core C. In the development of this armature (shown in Fig. 4) the slots are of the same size, since the separate cores are clearly shown. The winding is as follows: Starting from the commutator-bar 7, the winding passes through a slot 4 on the core A, then to a commutator-bar 8, diametrically opposite the bar 7, from the bar 8 to another slot 4 on the core A, diametrically opposite the first slot. From thence it passes to a commutator-bar 9 next adjacent to the bar 7, and from thence to a slot 5 in the core B next in front of the first slot of the core A. From slot 5 the winding passes to the commutator-bar 10 adjacent to the bar 8, and from thence to a slot 5 on the core B directly opposite the first slot. From the slot 5 the wire passes to a bar 11 adjacent to the bar 9, and from thence to a slot 6 on the core C; from the slot 6 to the bar 12 in front of bar 10, and from bar 12 to a second slot 6 on core C. From this slot the wire passes to a bar 13 next in front of bar 11, and from bar 13 to a slot 4 on the core A, half-way between the first two slots above-mentioned on the same core. Without tracing the winding completely it will be readily seen that after passing through two diametrically opposite slots in one core the winding passes through two similar slots on the next core, and then on the next core, the coils being thereby connected in series. By this construction of armature I increase the distance between the coils on each core, and thereby the effective polar surface of the core, without diminishing the total number of coils or commutator-bars for the entire armature. Furthermore, the number of slots in one of the cores will be only one-half or one-third or less part of the whole number of slots or armature-coils.

The machine illustrated in Figs. 1 and 2 is intended for use as an alternating-current synchronous motor, and is provided with a pair of collecting-rings 21 22. One of said rings is joined to one commutator-segment, and the other of said rings is joined to a commutator-segment which is ninety degrees from the first segment, the difference of potential between said segments being a maximum with a four-pole machine. The points at which the collecting-rings are connected to the armature will of course vary with the number of field-magnet poles with which the machine is provided.

For conveniently varying the connection of the machine to the supply-circuit in the method of operation hereinafter set forth I provide a switch, (illustrated diagrammatically in Fig. 1,) in which 50 is a base, of any suitable material, and 51 a switch-arm pivoted thereto at 52. The base of the switch carries three sets of contacts, (indicated by the numerals 53 to 62, inclusive.) The supply-mains are indicated at 63 and 64 and are connected through suitable terminals 65 and 66 to the switch-contacts, the terminal 65 being connected to the contacts 55 and 62 and the terminal 66 being connected to the contacts 59 and 58. The contact 53 is connected through a conductor 67 to one end of the winding 29 of the field-magnet, the other end of said winding being connected through the conductors 68 and 69 to the commutator-brush 23. The contact 54 is connected to the contact 56 and through the wire 70 to the other commutator-brush 24. The contact 57 is connected through the conductor 71 to one end of the field-magnet winding 27, the other end of which winding is connected through the conductors 72 and 69 to the commutator-brush 23. The contacts 60 and 61 are joined through the conductors 73 and 74, respectively, to the brushes 26 and 25, which press upon the collecting-rings. The switch-arm 51 is provided with bridge-pieces 75, 76, and 77, which are arranged to connect the contacts 53 and 54, 61 and 62, and 59 and 60, respectively, when the switch-arm is in the position shown in full lines, the bridge-pieces 76 and 77 being also arranged to connect the contacts 55 and 56 and 57 and 58, respectively, when the switch-arm is in the position shown in broken lines. Normally the switch-arm is maintained in the position shown in full lines by means of a suitable spring 78.

The method of operating is as follows: The mains 63 64 being supplied with alternating current, the switch-arm 51 is rotated on its pivot to the position shown in dotted lines, whereby the terminal 65 will be connected through the contacts 55 56 and wire 70 to the commutator-brush 24, and the terminal 66 will be connected through the contacts 58 and 57 and wire 71 to the end of the magnetizing-coil 27. Alternating current will therefore be supplied to the magnetizing-coil 27 and to the commutator through the brushes 23 and 24 and the armature thereby caused to rotate. The speed of the armature increases until synchronism with the generator supplying current to the mains 63 64 is obtained, and the switch-arm being then released the spring 78 operates to cause it to assume the position shown in full lines in the drawing. In this position of the arm the terminal 65 will be connected through contacts 62 61 and the conductor 74 to the brush 25, and the terminal 66 will be connected through the contacts 59 60 and conductor 73 through the brush 26, so that alternating current will be supplied to the armature through the collecting-rings. At the same time direct current will be supplied from the armature through brush 23, wire 69, wire 68, magnetizing-coil 29, wire 67, switch-contacts 53 and 54, wire 70, and brush 24, so that the field magnetism will be maintained. In operating machines in this manner the field-magnet coil through which an alternating current passes before synchronism is obtained must necessarily be composed of a few turns only, while that through which the rectified current from the commutator-brushes passes when the motor is running in synchronism with the generator should be composed of a large number of turns. Difficulty is experienced when running the motor up to synchronism from the fact that the alternating current in the field-magnet coils induces in the coaxial coils secondary currents of very high electromotive force, which may break down the insulation. To obviate this, I displace one set of coils with regard to the other, as indicated in Fig. 1, where the alternating-current coils are shown at 27, being wound in slots 28 in the pole-pieces, while the direct-current coils 29 are wound on the pole-pieces in the ordinary way. On consideration it will be found that the alternating current flowing in one coil 27 induces a current on the overlapping coil 29. The said coil 29 has also a current induced in it from the next adjacent coil 27 to the first mentioned, and this second induced current being opposite in direction to the first the total effect of the two currents will be *nil*.

Referring now to Fig. 5, 30 is the shaft of a synchronous motor, 21 and 22 being the collecting-rings. 31 is a flexible spring adjustably mounted in a slot 32 in the shaft 30 and secured therein by a set-screw 33. One of the collecting-rings 21 is uninsulated on a portion of its interior surface when the shaft has attained a certain speed. The centrifugal force acting on the flexible arm 31 will cause the same to make contact through the contact-point 34 with said ring. To the brush 26, which bears on the other collecting-ring 22, one terminal of a signal-lamp 35 is connected, the other terminal of said lamp being connected to the dynamo-frame and through the bearings with the shaft 30, as indicated diagrammatically by the line 36. The action of this device is as follows: When the speed of the shaft 30 reaches a certain amount, which can be regulated by adjusting the spring 31 in the slot 32, the contact-stud at the end of said spring makes connection with the ring 21, thereby closing a circuit between the two collecting-rings and the lamp 35 and lighting said lamp. In place of the lamp any suitable signal or alarm may be given. Obviously the use of a device similar to that described is not confined to the shafts of alternating-current motors, but may be used to indicate when any rotating shaft has attained a predetermined speed.

What I claim is—

1. A single-phase synchronous alternating-current electric motor, whose main field-magnet poles are slotted or perforated near the inner edge, and are supplied with two sets of windings, one winding surrounding the whole of each main polar projection, and the other winding surrounding one-half or a part of each of two adjacent main polar projections, combined with means whereby the latter winding is joined in series with the armature-winding when the motor is started and replaced by the first-mentioned winding when synchronism is attained, for the purpose specified.

2. A multipolar dynamo-electric generator or motor having a subdivided armature-core, each section of said core being supplied with an equal number of slots or perforations near the outer edge, and all secured to the same spindle in such a manner that the slots or perforations in each section of the cores are not in line with one another, but uniformly displaced relatively to one another, and having coils or windings placed in said slots, and connected successively in series with the commutator-segment in such a way that one end of each coil is joined at the commutator to the end of another coil on the same core.

3. A single-phase synchronous alternating-current electric motor, whose main field-magnet poles are slotted or perforated near the inner edge, and are supplied with two sets of windings, one winding surrounding the whole of each main polar projection, and the other winding surrounding one-half or a part of each of two adjacent main polar projections, combined with means whereby the latter winding is employed when the motor is started and the first-mentioned winding is employed when synchronism is obtained, for the purpose specified.

4. The combination with an alternating-current electric motor of a rod passing through a hole or slot in the spindle and substantially perpendicular to the axis thereof, a spring-arm supported at the end of said rod and a ring coaxial with the spindle and surrounding the rod and arm with which ring the end of the arm makes contact when the spindle attains a predetermined speed, substantially as and for the purpose specified.

In witness whereof I have hereunto set my hand in presence of two witnesses.

CONRAD LUDVIG ROSENQVIST.

Witnesses:
FREDERICK WILLIAM LE TALL,
LEONARD EDMUND HAYNES.